US011750499B1

(12) United States Patent
Saxena et al.

(10) Patent No.: US 11,750,499 B1
(45) Date of Patent: Sep. 5, 2023

(54) RESILIENT PATH(S) OF NON-OBLIGATORY NODES OF A NETWORK

(71) Applicant: International Business Machines Corporation, Armonk, NY (US)

(72) Inventors: Rajesh Kumar Saxena, Thane East (IN); Harish Bharti, Pune (IN); Anupam Gupta, Noida (IN); Sandeep Sukhija, Rajasthan (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/884,003

(22) Filed: Aug. 9, 2022

(51) Int. Cl.
*H04L 45/12* (2022.01)
*G16Y 40/30* (2020.01)
*G16Y 10/75* (2020.01)

(52) U.S. Cl.
CPC .............. *H04L 45/12* (2013.01); *G16Y 10/75* (2020.01); *G16Y 40/30* (2020.01)

(58) Field of Classification Search
CPC ........ G16Y 10/75; G16Y 40/30; G16Y 40/35; H04L 45/12
See application file for complete search history.

(56) References Cited

U.S. PATENT DOCUMENTS

| 2007/0070909 | A1* | 3/2007 | Reeve | H04L 45/50 370/238 |
| 2008/0183853 | A1* | 7/2008 | Manion | H04L 67/1093 709/223 |
| 2010/0332991 | A1* | 12/2010 | Banerjee | H04L 41/12 709/224 |
| 2017/0149792 | A1 | 5/2017 | Smith et al. | |
| 2017/0302688 | A1 | 10/2017 | Espes et al. | |
| 2018/0359678 | A1* | 12/2018 | Jones | H04W 40/12 |

(Continued)

FOREIGN PATENT DOCUMENTS

KR 102047848 B1 11/2019

OTHER PUBLICATIONS

S. Wu, H. Yin, H. Cao, L. Yang and H. Zhu, "Node ranking strategy in virtual network embedding: An overview," in China Communications, vol. 18, No. 6, pp. 114-136, Jun. 2021, doi: 10.23919/JCC.2021.06.010. (Year: 2021).*

(Continued)

*Primary Examiner* — Jason D Recek
(74) *Attorney, Agent, or Firm* — Zilka-Kotab, P.C.

(57) ABSTRACT

A computer-implemented method according to one embodiment includes defining a micro-operative of a first network. The first network has non-obligatory nodes, and the micro-operative includes rankings assigned to each of the nodes of the first network. Activated core covalences (ACCs) are established for the nodes. Each ACC defines a minimum number of neighboring nodes of the node associated with the ACC that, upon the minimum number of neighboring nodes being disconnected from the first network, cause the ranking of the associated node to decrease. An aggregated activated core covalence (A-ACC) is established, and the A-ACC corresponds to a sum of at least some of the ACCs of the nodes. The method further includes determining, based on the A-ACC, whether to perform a communication operation using a path that includes the nodes in the first network.

20 Claims, 9 Drawing Sheets

(56) References Cited

U.S. PATENT DOCUMENTS

2020/0007385 A1  1/2020  Obaidi

OTHER PUBLICATIONS

L. A. Maglaras and D. Katsaros, "New Metrics for Characterizing the Significance of Nodes in Wireless Networks via Path-Based Neighborhood Analysis," 2009 13th Panhellenic Conference on Informatics, Corfu, Greece, 2009, pp. 143-147, doi: 10.1109/PCI.2009.12. (Year: 2009).*

Al-Shammari et al., "Resilient Service Embedding in IoT Networks," arXiv, 2019, 11 pages, retrieved from https://arxiv.org/abs/1910.05783.

Al-Shammari et al., "Resilient Service Embedding in IoT Networks," IEEE Access, vol. 8, 2020, pp. 123571-123584.

O'KEEFE et al., "Frontier: Resilient Edge Processing for the Internet of Things," Proceedings of the VLDB Endowment, vol. 11, No. 10, 2018, pp. 1178-1191.

\* cited by examiner

RESILIENT PATH(S) OF NON-OBLIGATORY NODES OF A NETWORK

BACKGROUND

The present invention relates to networks, and more specifically, this invention relates to the resiliency of a path of non-obligatory nodes of a network.

In the current era of the Internet of Things (IoT), an array of devices and sensors are often used to form an internet-based network, e.g., a machine to machine network, to achieve a utility. For example, a first device, such as a computer, may communicate with a second device, such as a printer, to enable data from the computer to be printed. Communication between the first device and the second device may be conducted over one or more communication paths that each have a plurality of nodes that may be hopped between to establish the connection. For example, a communication may be output from the first device, transmitted along a path that includes a first plurality of nodes, and be received by the second device. An acknowledgement of receipt of the communication may be output from the second device, transmitted along a path that includes the first plurality of nodes and/or a second plurality of nodes, and be received by the first device. Additional communication paths may be present in the network, and may additionally and/or alternatively be used to transmit the communication.

SUMMARY

A computer-implemented method according to one embodiment includes defining a micro-operative of a first network. The first network has non-obligatory nodes, and the micro-operative includes rankings assigned to each of the nodes of the first network. Activated core covalences (ACCs) are established for the nodes. Each ACC defines a minimum number of neighboring nodes of the node associated with the ACC that, upon the minimum number of neighboring nodes being disconnected from the first network, cause the ranking of the associated node to decrease. An aggregated activated core covalence (A-ACC) is established, and the A-ACC corresponds to a sum of at least some of the ACCs of the nodes. The method further includes determining, based on the A-ACC, whether to perform a communication operation using a path that includes the nodes in the first network.

A computer program product according to another embodiment includes a computer readable storage medium having program instructions embodied therewith. The program instructions are readable and/or executable by a computer to cause the computer to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
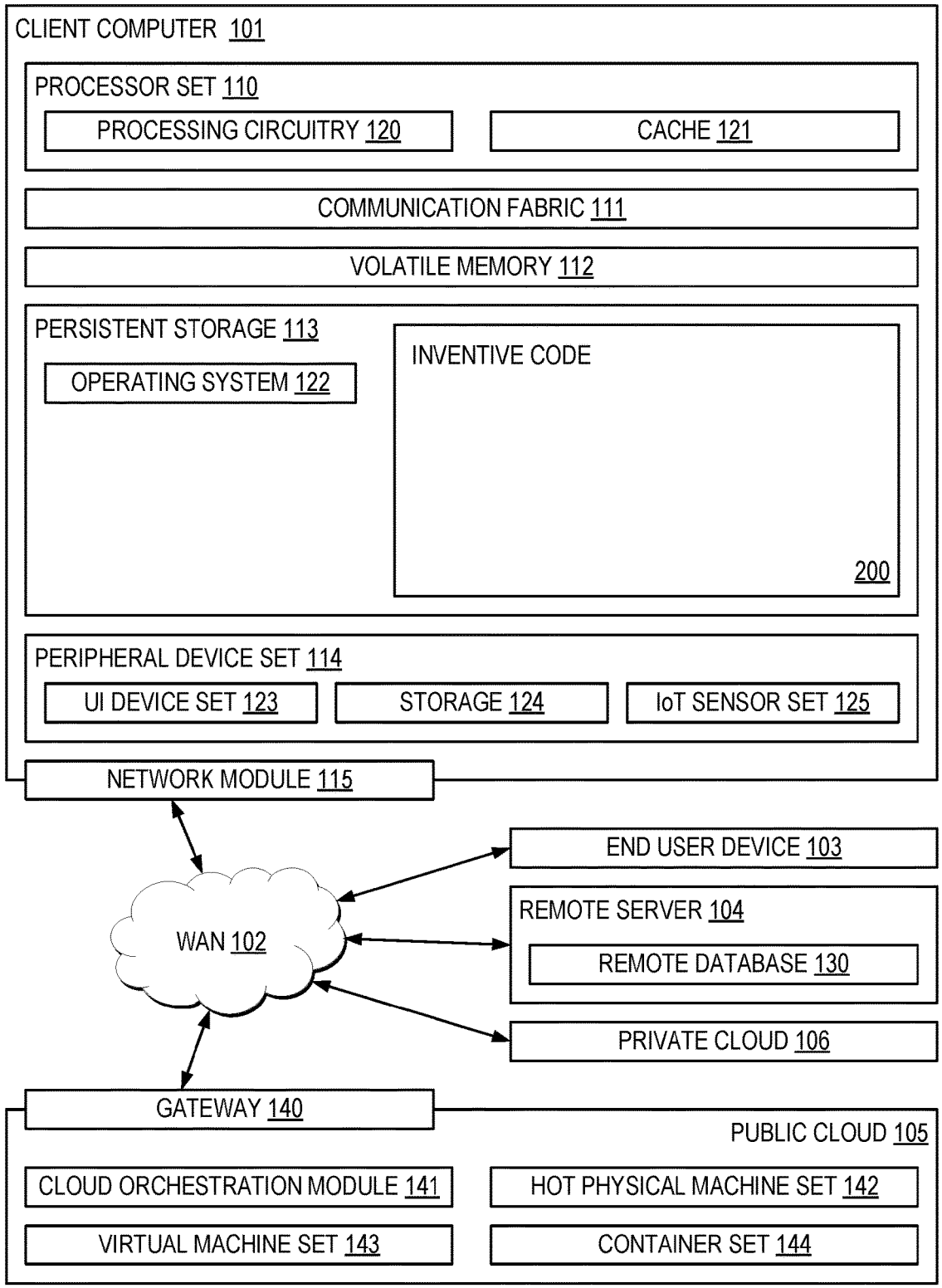
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for establishing path(s) of non-obligatory nodes of an internet-based network.

In one general embodiment, a computer-implemented method includes defining a micro-operative of a first network. The first network has non-obligatory nodes, and the micro-operative includes rankings assigned to each of the nodes of the first network. Activated core covalences (ACCs) are established for the nodes. Each ACC defines a minimum number of neighboring nodes of the node associated with the ACC that, upon the minimum number of neighboring nodes being disconnected from the first network, cause the ranking of the associated node to decrease. An aggregated activated core covalence (A-ACC) is established, and the A-ACC corresponds to a sum of at least some of the ACCs of the nodes. The method further includes determining, based on the A-ACC, whether to perform a communication operation using a path that includes the nodes in the first network.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as inventive code in block 200 for establishing resilient path(s) of non-obligatory nodes of an internet-based network. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

As mentioned elsewhere above, in the current era of the IoT, an array of devices and sensors are often used to form an internet-based network, e.g., a machine to machine network, to achieve a utility. For example, a first device, such as a computer, may communicate with a second device, such as a printer, to enable data from the computer to be printed. Communication between the first device and the second device may be conducted over one or more communication paths that each have a plurality of nodes that may be hopped between to establish the connection. For example, a communication may be output from the first device, transmitted along a path that includes a first plurality of nodes, and be received by the second device. An acknowledgement of receipt of the communication may be output from the second device, transmitted along a path that includes the first plurality of nodes and/or a second plurality of nodes, and be received by the first device. Additional communication paths may be present in the network, and may additionally and/or alternatively be used to transmit the communication.

Various embodiments and approaches described herein, e.g., see method 201, may be used to establish an active circuit between a requester and a service providing node through a range of non-obligatory participants. The resulting design is minimalistic in a way that various of the techniques described herein identify an activated core that has a supporting topology, herein referred to as "activated core," to support a transaction, e.g., herein referred to as a "path" of nodes. The activated core may include non-obligatory participants of a network, which is the part of an IoT network, where the activated core is capable of obtaining a utility. A framework may be used to establish this methodology by identifying a core of nodes that establish a resilient path of nodes, and eliminating a dependency on any other fringes that reduce this resiliency.

The nodes of such a resilient path are in some preferred approaches included in an activated core of an internet-based network. The activated core within the network may include non-obligatory nodes. Furthermore, the activated core preferably includes a number of nodes, which are affluent enough to create a path of non-obligatory nodes. This path provides utilities to individual demands, with each such transaction being setup as an activated circuit that is at least a portion of the activity core.

Now referring to FIG. 2, a flowchart of a method 201 is shown according to one embodiment. The method 201 may be performed in accordance with the present invention in any of the environments depicted in FIGS. 1-5C, among others, in various embodiments. Of course, more or fewer operations than those specifically described in FIG. 2 may be included in method 201, as would be understood by one of skill in the art upon reading the present descriptions.

Each of the steps of the method 201 may be performed by any suitable component of the operating environment. For example, in various embodiments, the method 201 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 201. Illustrative processors include, but are not limited to, a central processing unit (CPU), an application specific integrated circuit (ASIC), a field programmable gate array (FPGA), etc., combinations thereof, or any other suitable computing device known in the art.

In the process of establishing the resilient paths introduced elsewhere above, the techniques of various embodiments and approaches described herein enable a framework to practically eliminate fringes to an essential transaction supporting topology, e.g., paths of the activated core. In one approach, this process includes providing micro operatives that harmonize a network that includes the activated core. For example, operation 202 of method 201 includes defining a micro-operative of a first network. In some preferred approaches, the network may be an internet based network, e.g., an Internet of Things (IoT) network. Nodes of the network may be non-obligatory nodes, meaning that the nodes cannot be relied on to be available to use at a given time, but are available to use within the network at least some of the time. At least some of the non-obligatory nodes of the network may establish an activated core. The activated core is configured to have a minimal utility driven topology that makes the network functional. A "minimal utility driven topology" is one in which each of the nodes of the activated core are connected to at least one other node that retains connection to the network at all times. For example, a first node of the activated core may be connected to a second device that loses connection with the network for two minutes each day, but also is connected with a third node that remains connected with the network during those two minutes. Note that the third node may lose connection with the network at another time each day, but during this time it may be presumed that the second node and/or some other node of the network remains connected, e.g., directly or indirectly, and available to establish a communication path with the first node within the network. Because node connection, and more specifically a communication path, is maintained within the network despite losing various node connections at different times, the minimal utility driven topology is maintained. It should be noted that, because the participants of an activated core of a network are non-obligatory in nature, a relatively higher latency is acceptable, and the network drives the traffic routing specific to the transaction at hand.

To define a micro-operative, it is in some approaches assumed that the network includes non-obligatory nodes. Each node may be assigned with a core number ranking, e.g., hereafter referred to as "ranking." Thereafter a portion of the nodes, e.g., a first portion, of the network are randomly removed, e.g., at least temporarily masked from the remainder of the nodes of the network, and an effect of this masking on the rankings of the nodes is determined, e.g., whether the ranking of a given node decreases, increases or remains the same. Based on this a relationship may be established and it may be judged whether the randomly removed part of the network includes the activated core nodes or not, and will fully function without the rest of the network nodes which includes at least some non-obligatory nodes. According to one illustrative approach, defining the micro-operative of the first network may include masking a first group of the nodes from the first network, and determining an effect that the masking has on the rankings of a second group of the nodes. The second group of the nodes may in some approaches include a remainder of the non-obligatory nodes of the network that are not masked with the first group of the nodes. The effect that the masking of the first group of the nodes has on the second group of the nodes may include one or more losses of connection within the second group of nodes. This is because some connections, e.g., communication paths, that include nodes of the second group of nodes may rely one or more nodes of the first group of nodes being present, e.g., not masked and instead connected in the internet-based network. When masked however, these nodes of the first group of nodes are not present in the internet-based network, and therefore an effect of the masking may include one or more connections may be at least temporarily lost. In some approaches, in response to a determination that a node loses connection, e.g., with at least one other device of the internet-based network, as a result of other nodes being masked in the internet-based network, a ranking of the node that loses one or more connections may be decreased a predetermined amount. Note that the second group of the nodes may be nodes that remain included in and not unmasked in the internet-based network while the first group of the nodes are masked in the internet network. The first group of nodes may be unmasked after a predetermined amount of time, e.g., thereby returning the internet-based network to a state that existed prior to the masking of the first group of nodes. A second group of nodes may be masked from the internet-based network. An effect that the masking of the second group of nodes has on rankings assigned to the nodes, e.g., other nodes of the internet-based network that are not masked with the second group of nodes, may be determined. Techniques similar to those described above may be used to determine the effect that the masking of the second group of nodes has on rankings assigned to the nodes. The second group of nodes may optionally be unmasked, e.g., thereby returning the internet-based network to a state that existed prior to the masking of the second group of nodes. Note that additional groups of nodes may be masked in addition to and/or alternative to the groups mentioned above.

The masking process preferably provides activated core nodes that remain fully functional without a remainder of the network non-obligatory nodes. An impact that the masking has on rankings of the nodes may in some approaches be represented by creating randomly triangle tiled graph "G" which may be equivalent to the first network, e.g., see Equation (1) elsewhere below.

The randomly triangle tiled graph "G" may be created in which each individual node carries out a function being referred to as micro-operative. In some approaches, each individual node, e.g., see "u" and "v" in the equations below, is assigned a micro-operative. These micro-operatives are operations in which nodes exchange predetermined types/amount of data. In some more specific approaches, the micro-operative may include one node manipulating data, e.g., multiplying a value of a first node, dividing data of a first node, etc., and determining at a second node if a result of the manipulated data is a correct value, e.g., an expected value. Based on these exchanges of data, it may be determined whether or not connections remain established between two nodes. For example, it may be determined that a connection is lost in response to a determination that an exchange of data between nodes fails. In contrast, it may be determined that a connection is not lost in response to a determination that an exchange of data between nodes is successful. In one approach, it may be determined that 'uv' exists as an edge, when both the nodes "u" and "v" share at least one micro-operative, e.g., an micro-operative exchange between the nodes is determined to be successful. Furthermore, 'n' nodes of the internet-based network are distributed uniformly, and are assumed to be on one side of the network. The variable "r" represents the communication impedance, e.g., the opposite of flow, which is reduced to one if every two nodes are able to communicate with each other. In one preferred approach, the tiled graph "G," e.g., which is unbiased based on the symmetric (r=1), includes the following properties:

$$G_{r,\theta,\mho}^n \begin{cases} \mho_u \subseteq [\mho] \\ \mho_u \cap \mho_v \neq \theta \end{cases} \xrightarrow{symmetric(r=1)} G_{\theta,\mho}^n \qquad \text{Equation (1)}$$

The metric of ACA, of the network "G" as defined in Equation (1) may then be defined as a correlation between the rankings, e.g., core number rankings, of a top η % nodes, as ranked by the ranking (core number), before and after ρ % edges or nodes are removed at random. This enables the nodes that are not changing in ranking (retaining resilient connections) to remain on the top, while other nodes that have a changed ranking to switch to one or zero to thereby not be relied on in resilient paths of an activated core of the network. According to one approach, this may be defined using Equation (2) below.

$$\mathcal{R}_\eta^\rho(G) \xrightarrow{\text{Nodes compromised}} G^p :: V_r \supseteq \eta \qquad \text{Equation (2)}$$

Operation 204 of method 201 includes establishing activated core covalences (ACCs) for some or all of the nodes. For context, each ACC defines a minimum number of neighboring nodes of the node associated with the ACC that, upon the minimum number of neighboring nodes being disconnected from the first network, cause the ranking of the associated node to decrease. The ACC of a given node "u" of the first network in G may in some approaches be denoted as $$\mathcal{\ddot{R}}_\eta^{(u,G)}.$$

For the node "u," the set of nodes that depend on the node "u" for core numbers may be represented as a vector by $V_\delta \cap \Delta < (u, G)$. According to one example, illustrative nodes $v_0$ and $v_1$ may be considered, and it may be assumed that the nodes "$v_0$" and "$v_1$" have "$m_0$" and "$m_1$" neighbor nodes with higher rankings, and it may be assumed that a ranking of the node "$m_0$" is less than a ranking of the node "$m_1$", e.g., $m_0 < m_1$. The dependence of "$v_0$" on the node "u" is then stronger than that of node "$v_1$" on node "u." Accordingly, the ACC contribution of a node "v" may be divided equally between all nodes in $\Delta > (v, G)$. This way, the ACC of node "u" may in one approach be defined using Equation (3) below.

$$\mathcal{\ddot{R}}_\eta^{(u,G)} = \sum_{v \in V_\delta \cap \Delta < (u,G)} \frac{\left\{1 - \frac{|\Delta = (v, G)|}{K(u, G)}\right\}}{|\Delta > (u, G)|} \qquad \text{Equation (3)}$$

To compute the ACC of all the nodes in the network, e.g., in "G" of the example above, a value of all the rankings of the nodes may be initialized to one. A computing of the ACC of the nodes may begin with the nodes with a minimum ranking and proceed until reaching the nodes with maximum ranking. Because the ACC of a node is only influenced by that of nodes with a lower ranking, only one computing iteration of partitioning the network nodes via masking is performed in some approaches to compute the ACC of all the nodes. In some other approaches, additional iterations of partitioning the network nodes via masking may be performed.

In some approaches, in order to characterize the network, e.g., with respect to a resiliency of one or more of the nodes of the network, the established ACCs may be aggregated. Accordingly, an aggregated activated core covalence (A-ACC) may be established, e.g., see operation 206. The A-ACC in some approaches corresponds to a sum of at least some of the ACCs of the nodes. For purposes of an example, in various of the equations below it may be assumed that $$\mathcal{\ddot{R}}_f^{(u,G)}$$

is the $f^{th}$ percentile of core influence of all nodes in "G." In some approaches, the A-ACC does not incorporate the ACC of at least some of the nodes of the network. For example, a first of the nodes may be not incorporated into the A-ACC in response to a determination that the minimum number of neighboring nodes defined by the ACC of the first node is less than a predetermined threshold. Here, what would otherwise be a "long tail" of the A-ACC, is cut from the aggregation by not being incorporated into the A-ACC. These nodes are not included in the A-ACC because they do not include large ACCs, e.g., relative to the ACCs of other nodes that are incorporated into the A-ACC, and therefore would not otherwise significantly contribute to a resilient path of the network, e.g., less than 1% of contribution, less than 5% of contribution, less than 10% of contribution, etc. For example, $$\mathcal{\ddot{R}}_{sf}^{(u,G)}$$

may define a set of nodes in "G" with ACCs that are equal to or greater than $$\mathcal{\ddot{R}}_f^{(u,G)}$$

in Equation (4) below. In some approaches the aggregation may be performed on a percentile basis, e.g., out of a 100% maximum potential percentile. Such a percentile basis may be particularly useful for a probability distribution function, e.g., see f of Equation (4).

$$\mathcal{\ddot{R}}_{sf}^{(u,G)} = \left\{ u : u \in V \wedge \mathcal{\ddot{R}}_f^{(u,G)} \geq \mathcal{\ddot{R}}_{sf}^{(u,G)} \right\} \qquad \text{Equation (4)}$$

$$\mathcal{\ddot{R}}_{sf}^{(u,G)}$$

may then be deducted as the mean A-ACC subsequent to at least some of the nodes being filtered out as fringes from the aggregation. The A-ACC of the nodes that are considered, e.g., not otherwise filtered out as described above may be determined in some approaches using Equation (5) below.

$$\mathcal{\ddot{R}}_{sf}^{(u,G)} = \frac{\sum_{u \in \mathcal{R}_{sf}^{(u,G)}} \mathcal{R}_\eta^{(u,G)}}{|\mathcal{\ddot{R}}_\eta^{(u,G)}|} \qquad \text{Equation (5)}$$

Generally speaking, e.g., from a perspective where the A-ACCs of a plurality of networks are being compared, a network that has a relatively high $$\frac{\Xi^{(u,G)}}{\mathcal{R}_{sf}}$$

within the $f^{th}$ percentile of core influence of all nodes in "G," this means that the most influential nodes are unlikely to experience a decrease in ranking upon such nodes losing connection(s) with neighboring nodes. Accordingly, such a network may be determined to have a relatively high core resilience. In contrast, the networks for which $$\frac{\Xi^{(u,G)}}{\mathcal{R}_{sf}}$$

is relatively low are expected to have low core resilience. It should be noted that in some approaches, a plurality of networks may be available for performing communication operations on, e.g., using the nodes of such networks for communication paths for example. Accordingly, in some approaches, one or more operations of method 201 may determine, based on one of more A-ACCs, a network to perform a communication operation in. For example, operation 208 includes determining, based on the A-ACC, whether to perform a communication operation using a path that includes the nodes in the first network, and more specifically where the path includes the at least some of the nodes represented in the A-ACC. This path acts as a resilient activated circuit of at least some of the nodes of the activated core. Such a communication may include a known type of communication operation, e.g., a transmission between a source device and a target device, a handshake, a unidirectional communication, a request for information, etc. In some other approaches, a previously performed communication may be modified to establish the communication operation. For example, in response to a determination that a value of the A-ACC is greater than a predetermined threshold, a frequency of the previously performed communication may be increased a predetermined amount. A number of transactions that are performed in the first network, e.g., such as along the path, may additionally and/or alternatively be increased a predetermined amount in response to a determination that a value of the A-ACC is greater than a predetermined threshold. In contrast, in response to a determination that a value of the A-ACC is not greater than a predetermined threshold, the frequency and/or the number of transactions may be decreased a predetermined amount. Note that the A-ACC of a given network may change a different time periods, e.g., during the daytime and at night. Accordingly, in some approaches, an optional operation of method 201 may include determining a plurality of A-ACCs for one or more networks and using such A-ACCs for one or more of the comparisons described elsewhere below.

In some approaches, the first network may be the only network available for performing the communication operation. In such an approach, the A-ACC of the first network may be compared with a predetermined threshold to determine whether to perform a communication operation using a path that includes the nodes in the first network. The predetermined threshold may be adjusted, e.g., increased, in response to a determination that a performance of communication operations in the network are less than a predetermined threshold, e.g., determined by considering one or more known type of network performance metrics. In contrast, the predetermined threshold may be adjusted, e.g., decreased, in response to a determination that a performance of communication operations in the network are more than a predetermined threshold, e.g., determined by considering one or more known type of network performance metrics. This allows throttling of a total amount of network resources that are utilized for communication operations while maintaining at least a tolerable degree of performance.

Although various of the operations described in various embodiments and approaches are performed with respect to the first network, in some approaches an A-ACC of one or more additional networks may be determined. As will now be described below, with the A-ACCs of multiple networks determined, it may be determined which of the networks and a path thereof to use for performing a communication operation at a given time.

Figure 2A:
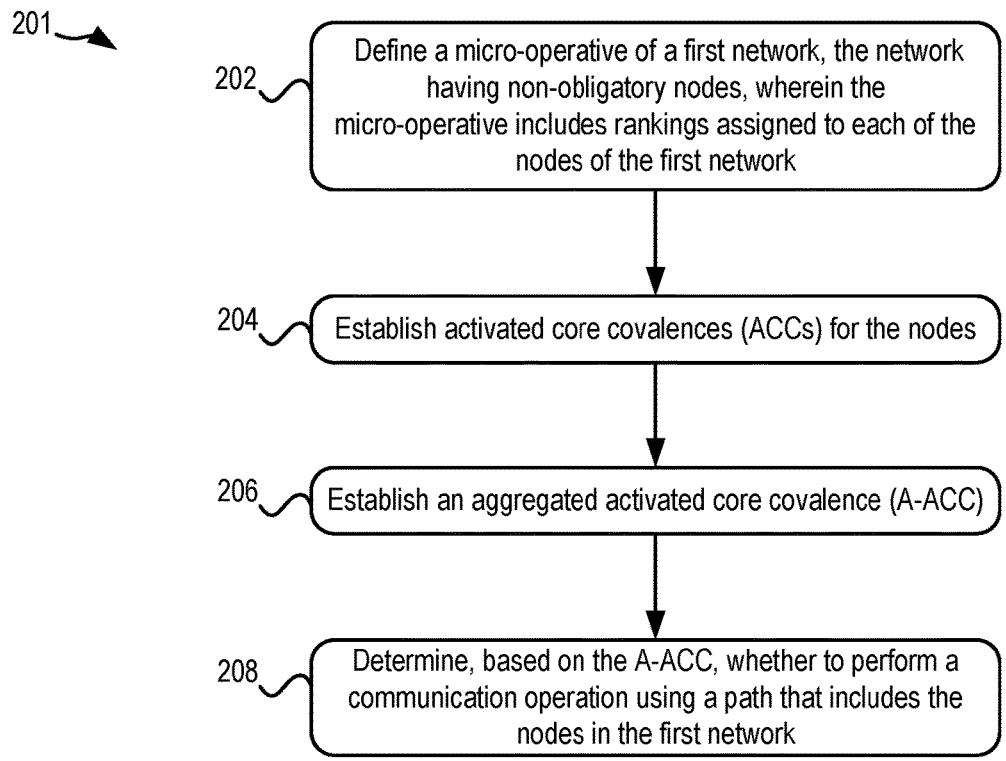
FIG. 2A is a flowchart of a method, in accordance with one embodiment of the present invention.
Figure 2B:
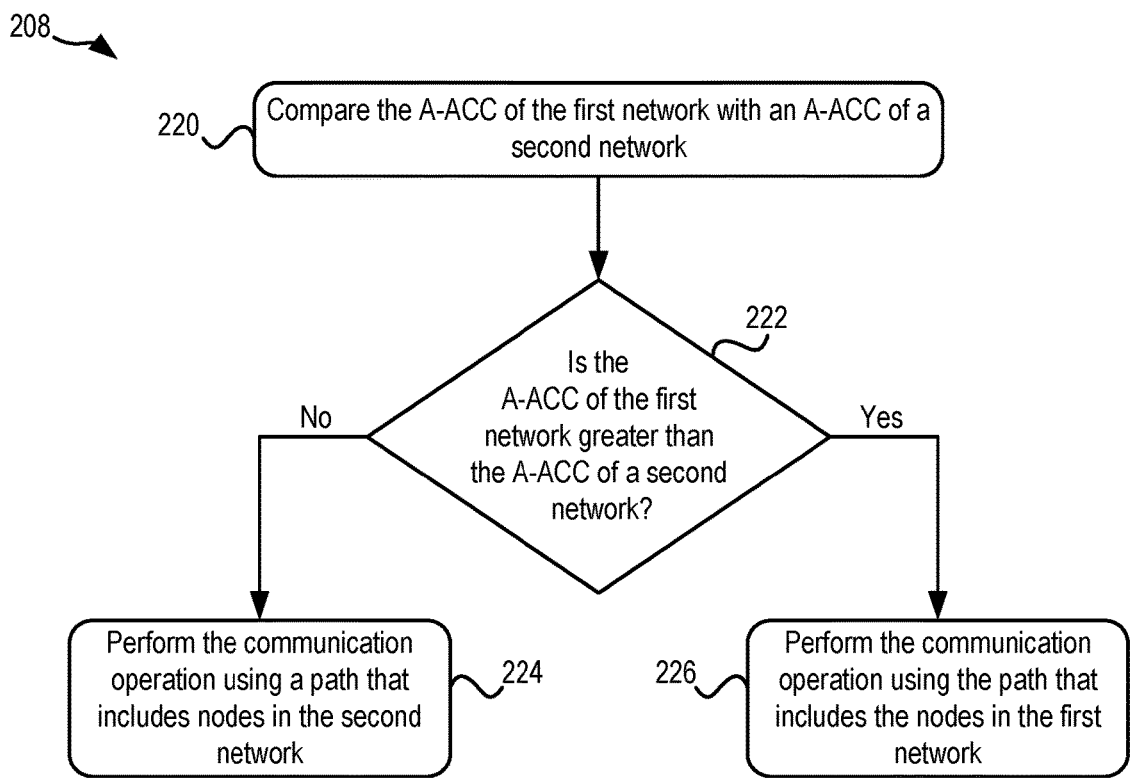
FIG. 2B is a flowchart of sub-operations of an operation of the method of FIG. 2A.

Looking to FIG. 2B, exemplary sub-operations of determining, based on the A-ACC, whether to perform a communication operation using a path that includes the nodes in the first network are illustrated in accordance with one embodiment, one or more of which may be used to perform operation 208 of FIG. 2A. However, it should be noted that the sub-operations of FIG. 2B are illustrated in accordance with one embodiment which is in no way intended to limit the invention. Note that it may be assumed that in various of the approaches below, techniques similar to those described elsewhere above for determining the A-ACC of the first network have been utilized to determine additional A-ACCs of other networks, e.g., an A-ACC of a second network that is an internet based network and includes non-obligatory nodes, an A-ACC of a third network that is an internet based network and includes non-obligatory nodes, an A-ACC of a fourth network that is an internet based network and includes non-obligatory nodes, etc.

Sub-operation 220 of FIG. 2B includes comparing the A-ACC of the first network with an A-ACC of a second network. A known value comparison technique may be used to perform the comparing. From the comparison, it may be determined whether the A-ACC of the first network is greater than the A-ACC of the second network, e.g., see sub-operation 222. In response to a determination that the A-ACC of the first network is not greater than the A-ACC of the second network, e.g., as illustrated by the "No" logical path of sub-operation 222, the communication operation is optionally performed using a path of nodes in the second network, e.g., see sub-operation 224. Moreover, in response to the determination that the A-ACC of the first network is not greater than the A-ACC of the second network, the communication operation is optionally not performed using a path of nodes in the first network. For context, a network including a relatively higher A-ACC may indicate that the path(s) of the network are relatively more resilient than the paths of a network determine to have a relatively lower A-ACC. Accordingly, in some approaches communication operations are performed on path(s) of networks determined to have relatively higher A-ACCs. Such path(s) may be identified as hops that establish a communication between a source device and a target device of a communication operation. In response to a determination that the A-ACC of the first network is greater than the A-ACC of the second network, e.g., as illustrated by the "Yes" logical path of sub-operation 222, the communication operation is optionally performed using a path of nodes in the first network, e.g., see sub-operation 226. Moreover, in response to the determination that the A-ACC of the first network is greater than the A-ACC of the second network, the communication operation is optionally not performed using the path of nodes in the second network.

Figure 2C:
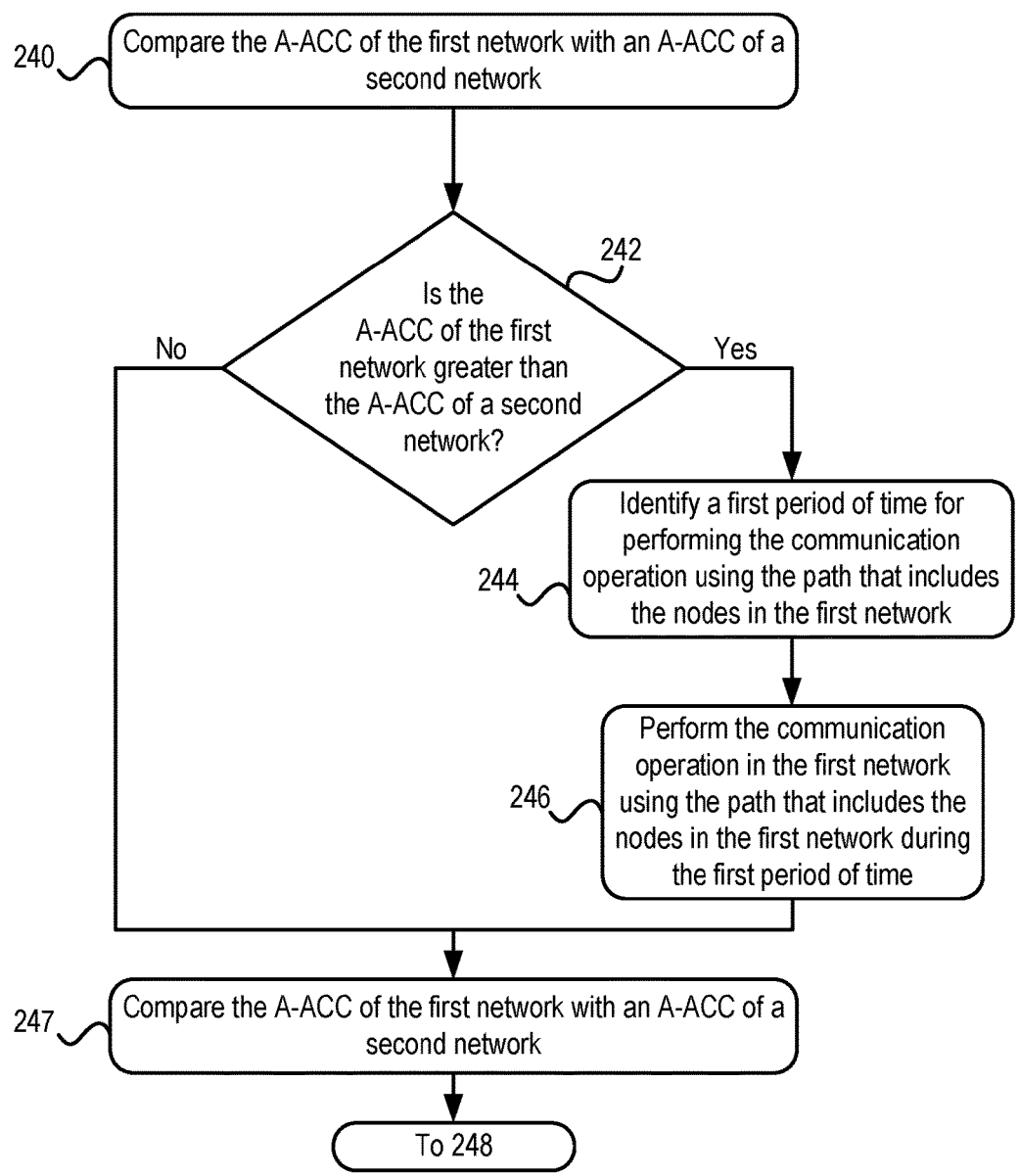
FIG. 2C is a flowchart of sub-operations of an operation of the method of FIG. 2A.
Figure 2C:
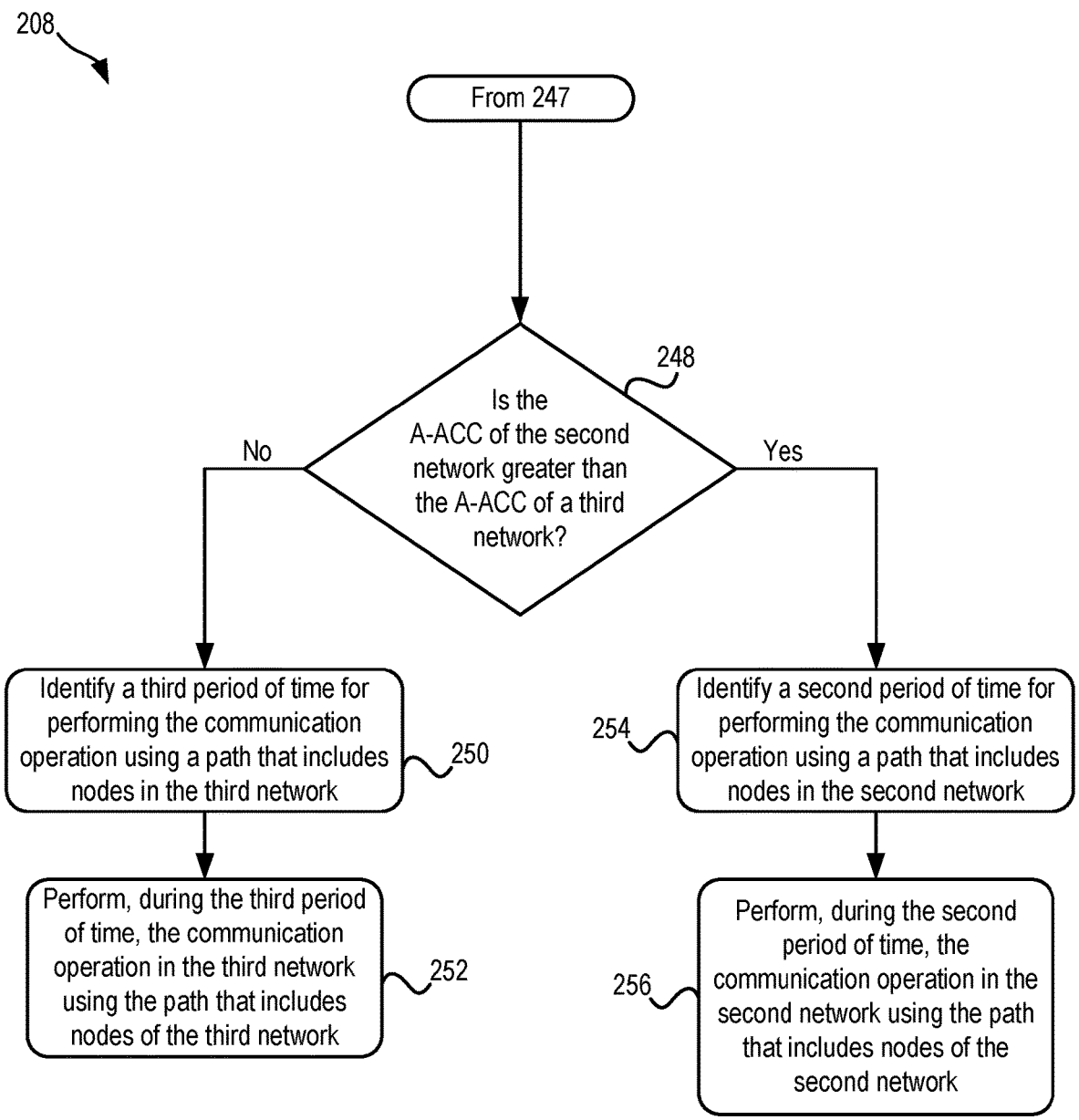

Looking to FIG. 2C, exemplary sub-operations of exemplary sub-operations of determining, based on the A-ACC, whether to perform a communication operation using a path that includes the nodes in the first network are illustrated in accordance with one embodiment, one or more of which may be used to perform operation 208 of FIG. 2A. However, it should be noted that the sub-operations of FIG. 2C are illustrated in accordance with one embodiment which is in no way intended to limit the invention.

Sub-operation 240 of FIG. 2C includes comparing the A-ACC of the first network with an A-ACC of a second network. From the comparison, it may be determined whether the A-ACC of the first network is greater than the A-ACC of the second network, e.g., see sub-operation 242. In response to a determination that the A-ACC of the first network is greater than the A-ACC of the second network, e.g., as illustrated by the "Yes" logical path of sub-operation 242, a first period of time for performing the communication operation using the path that includes the nodes in the first network is identified, e.g., see sub-operation 244. In sub-operation 246 the communication operation is performed in the first network using the path that includes the nodes in the first network during the first period of time. The first period of time may be a period of time that a device that initiates the communication operation is within a predetermined range of the first network, e.g., is able to use the path of the first network based on being within the predetermined range. For example, in one approach, the device that initiates the communication operation may be a drone that is passing through multiple geo-spatial networks. During the first period of time the drone may be passing within a predetermined range of the first network and the second network. However, in response to a determination that the A-ACC of the first network is greater than the A-ACC of the second network, the drone may perform a communication operation using a path that includes the nodes in the first network during the first period of time. Note that in such approaches, the path that includes the nodes in the first network are what the A-ACC of the first network is based on.

In contrast, in response to a determination that the A-ACC of the first network is not greater than the A-ACC of the second network, e.g., as illustrated by the "No" logical path of sub-operation 242, the A-ACC of the second network is compared with an A-ACC of a third network, e.g., see sub-operation 247. Based on the comparison, it may be determined whether the A-ACC of the second network is greater than the A-ACC of a third network, e.g., see sub-operation 248. In response to a determination that the A-ACC of the second network is greater than the A-ACC of the third network, e.g., as illustrated by the "Yes" logical path of sub-operation 248, a second period of time for performing the communication operation using a path that includes nodes in the second network is identified, e.g., see sub-operation 254. Furthermore, the communication operation may be performed, e.g., see sub-operation 256, during the second period of time, in the second network using the path that includes nodes of the second network, e.g., a path of nodes that the A-ACC of the second network is based on. In some approaches, the first period of time is different than and does not overlap with the second period of time. Furthermore, the communication operation is in some approaches not performed using the path that includes the nodes in the second network during the first period of time, and the communication operation may not be performed using the path that includes the nodes in the first network during the second period of time. For example, in continuation of the drone example above, the drone may in some approaches perform a first communication using the path that includes nodes of the first network while in a first location that is in range of the first and second network. In a second location, the drone may be in range of the second network and the third network. In the second location, in response to a determination that the A-ACC of the second network is greater than the A-ACC of the third network, the drone may perform a second communication using the path that includes the nodes in the second network during the second period of time.

In response to a determination that the A-ACC of the second network is not greater than the A-ACC of the third network, e.g., as illustrated by the "No" logical path of sub-operation 248, a third period of time for performing the communication operation using a path that includes nodes in the third network is identified, e.g., see sub-operation 250. Furthermore, a communication operation may be performed, during the third period of time, in the third network using the path that includes nodes of the third network, e.g., a path of nodes that the A-ACC of the third network is based on, e.g., see sub-operation 252.

Various benefits are enabled as a result of utilizing the techniques described herein to determine, based on an A-ACC, whether to perform a communication operation using a path that includes the nodes in a network. For example, at least one resilient path is determined in network of non-obligatory nodes. A resilient path of an activated core of a network that includes non-obligatory nodes has not been determined based on an ACC, nor based on an A-ACC in conventional techniques. Accordingly, the inventive discoveries disclosed herein proceed contrary to conventional wisdom. The various benefits that are enabled as a result of implementing the techniques described in various embodiments and approaches described herein further include improvements to the functioning of computer related devices of an internet-based network. For example, the framework described in various embodiments and approaches described herein to obtain a resilient path of an activated core in an internet-based network maintains communication connections among non-confirmatory nodes in an internet-based network. Note that this resilient path is maintained despite one or more neighboring nodes of the nodes of the path losing connection with the system at one time or another. Because these connections are maintained, overhead is decreased, which results in an increased efficiency and reliability of communication operations performed in the internet-based network when compared to conventional techniques that fail to use ACC and A-ACC.

Figure 3:
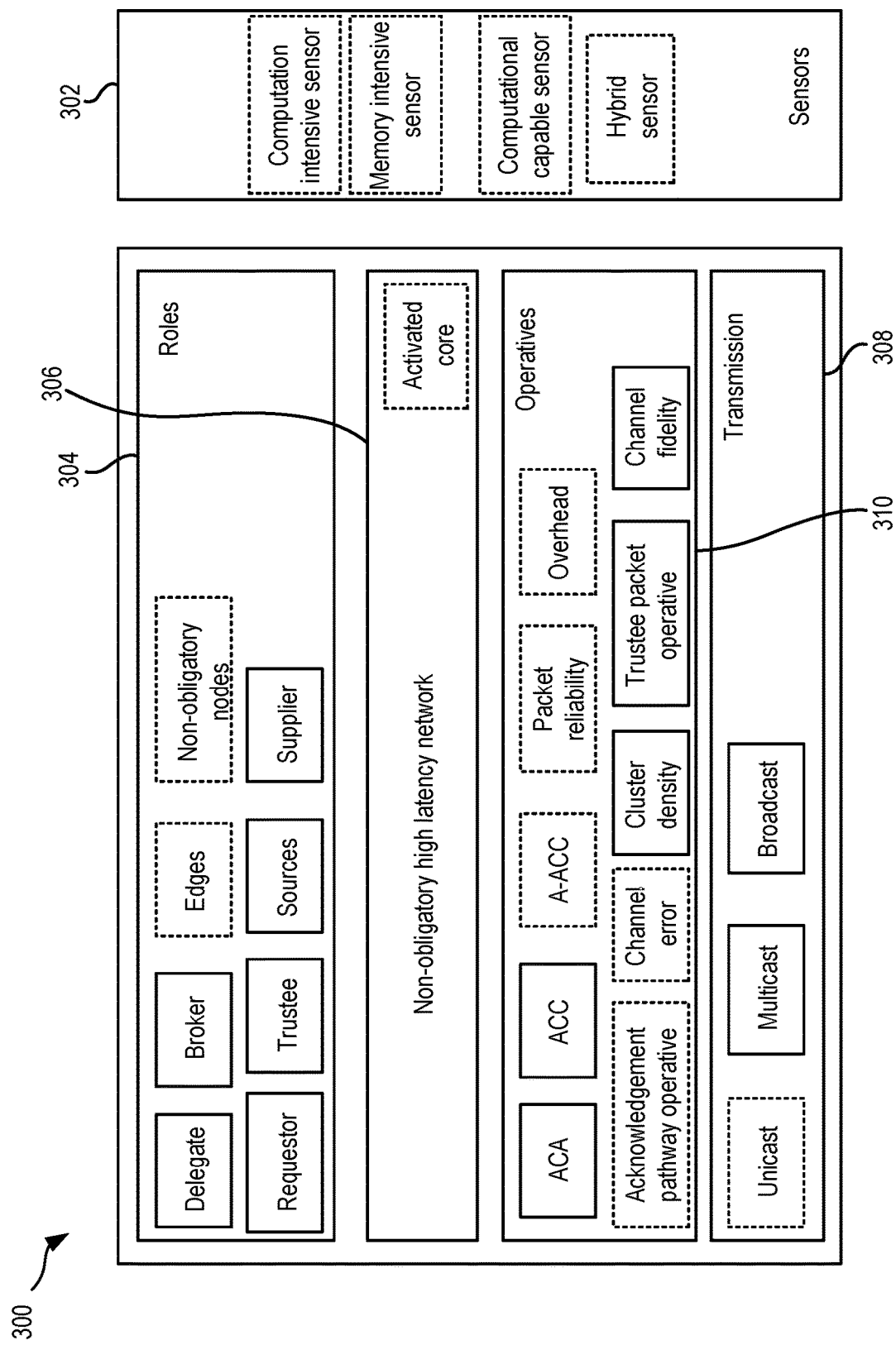
FIG. 3 is a reference architecture, in accordance with one embodiment.

FIG. 3 depicts a reference architecture 300 for establishing path(s) of non-obligatory nodes of an internet-based network, in accordance with one embodiment. As an option, the present reference architecture 300 may be implemented in conjunction with features from any other embodiment listed herein, such as those described with reference to the other FIGS. Of course, however, such reference architecture 300 and others presented herein may be used in various applications and/or in permutations which may or may not be specifically described in the illustrative embodiments listed herein. Further, the reference architecture 300 presented herein may be used in any desired environment.

It may be prefaced that the dashed lines of the reference architecture 300 indicate features that are enabled in an illustrative approach to establish path(s) of non-obligatory nodes of an internet-based network.

The reference architecture 300 includes sensors 302 which are devices which can measure property and respond with feedback. In some approaches these devices are the core building block of the M2M network. The reference architecture 300 also includes roles 304, which are the different roles that a sensor may play depending on capabilities of the sensor. An activated core of a non-obligatory high latency network 306 is a network within the M2M network that is formed by non-obligatory participants. In some approaches, because the participants are non-obligatory, a relatively high latency is expected. The reference architecture 300 also includes operatives 310 that define how these sensors and capabilities thereof are used to achieve a predetermined task. Finally, the reference architecture 300 includes a transmission 308 that defines a flow within the network.

Figure 4:
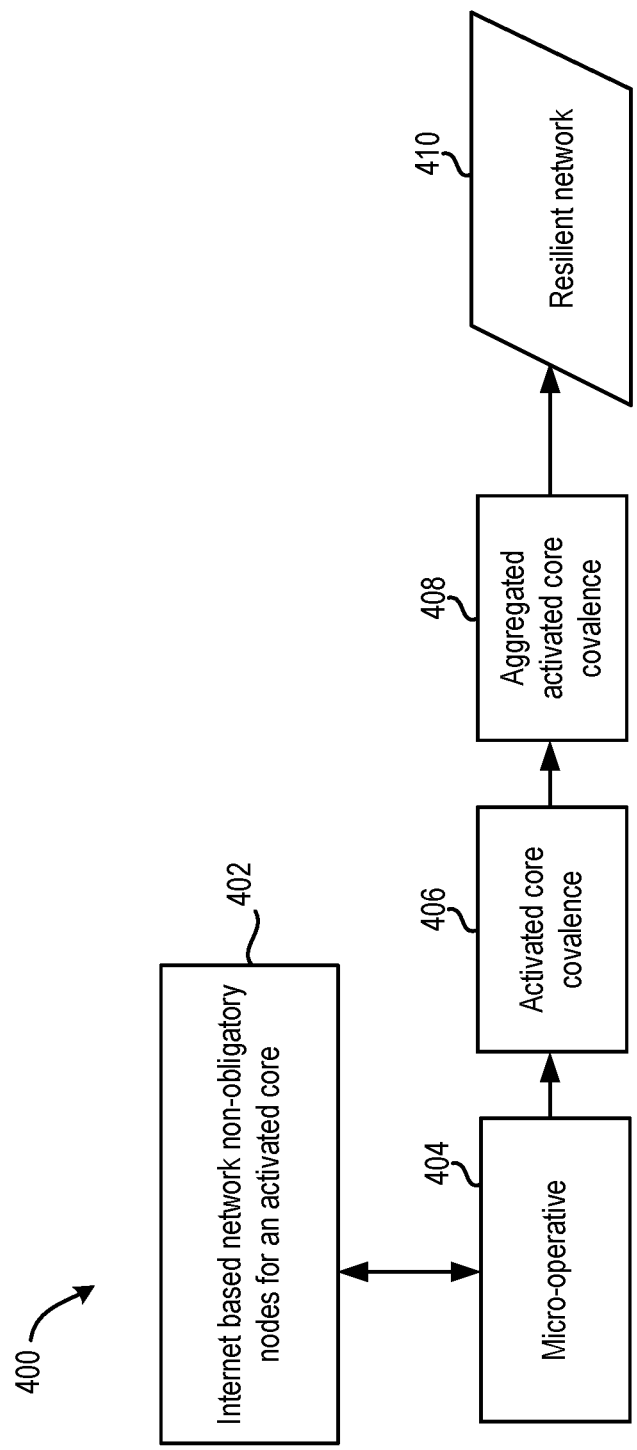
FIG. 4 is an architecture, in accordance with one embodiment.

FIG. 4 depicts an architecture 400, in accordance with one embodiment. As an option, the present architecture 400 may be implemented in conjunction with features from any other embodiment listed herein, such as those described with reference to the other FIGS. Of course, however, such architecture 400 and others presented herein may be used in various applications and/or in permutations which may or may not be specifically described in the illustrative embodiments listed herein. Further, the architecture 400 presented herein may be used in any desired environment.

The architecture 400 includes an internet-based network 402 with non-confirmatory nodes and with an activated core which is made up of non-obligatory participants. A network resilience construct enables micro-operatives 404 to de defined, e.g., using techniques similar to those described elsewhere above, e.g., see operation 202 of method 201. The ACC measures the resilience of individual nodes of the network.

With continued reference to FIG. 4, ACCs 406 for some or all of the nodes of the network may be determined using techniques similar to those described elsewhere above, e.g., see operation 204 of method 201. Furthermore, an A-ACC 408 may be established that corresponds to a sum of at least some of the ACCs 406. For example, by aggregating the ACC the A-ACC 408 is determined which helps to not only define the network resilience, but also the extent of network resilience. For example, the A-ACC may be used to establish a resilient network 410 having at least one resilient path of nodes.

Figure 5A:
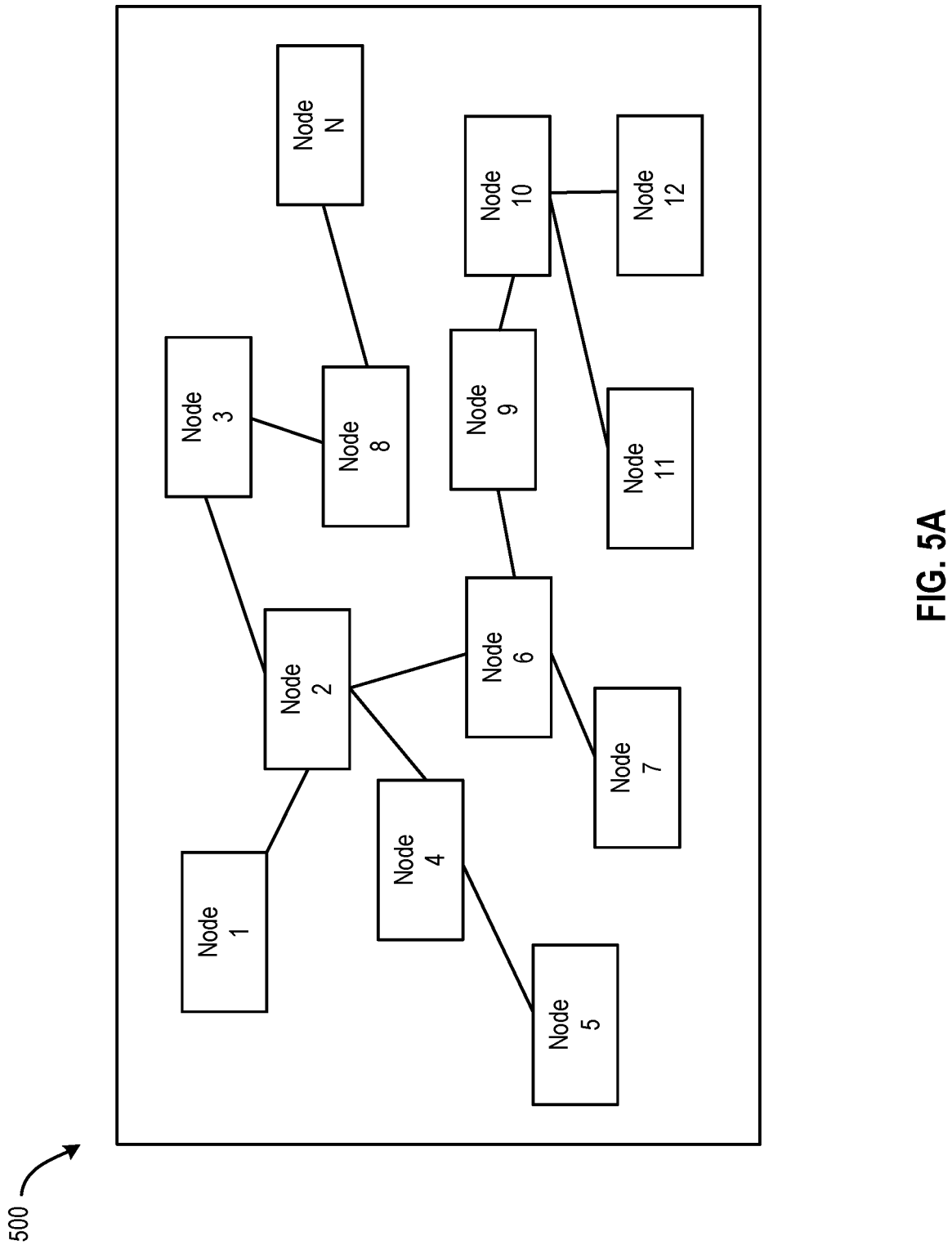
FIGS. 5A-5C depict the progression of a process of determining a resilient portion of a network, in accordance with one embodiment.
Figure 5B:
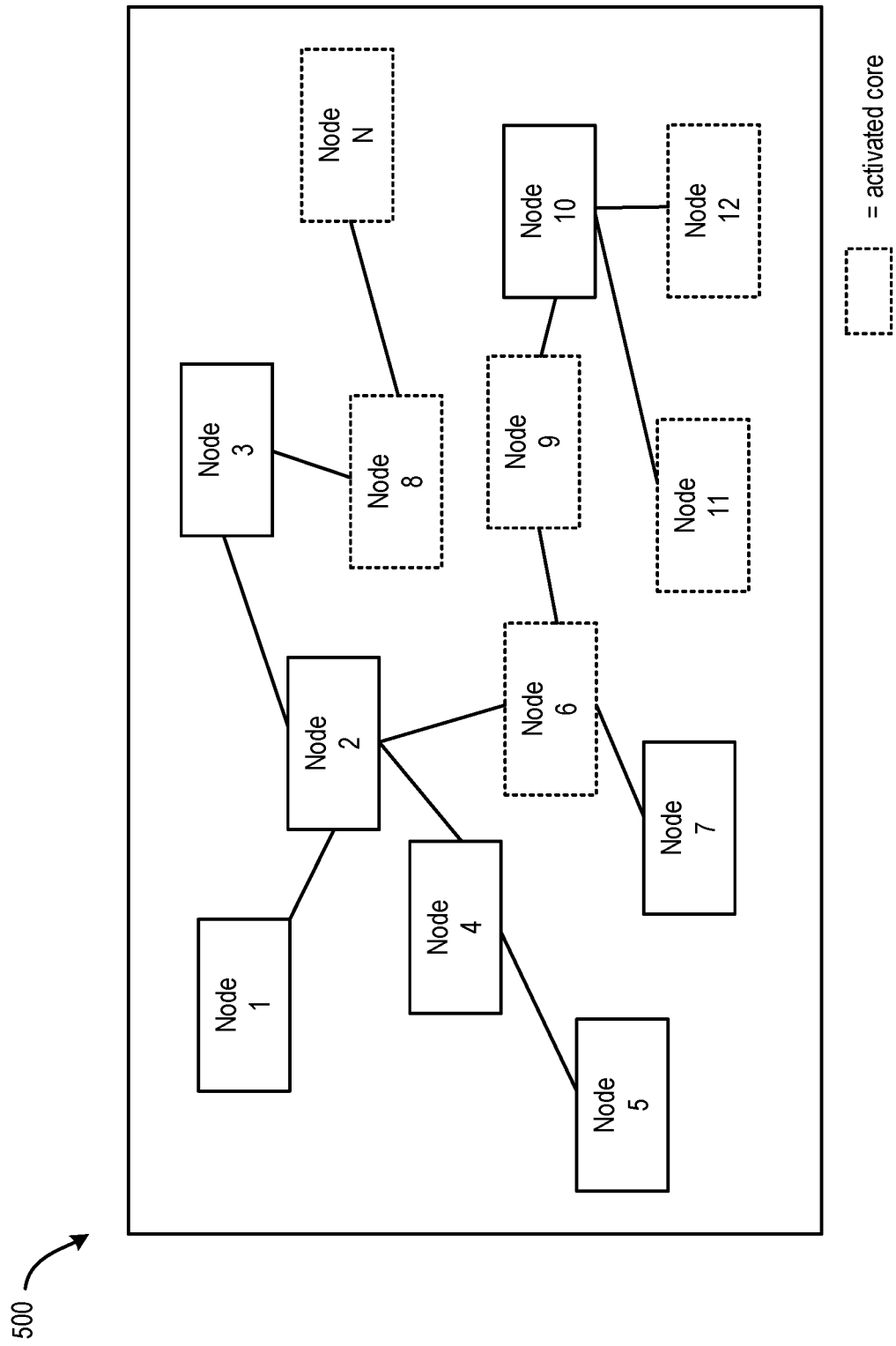
Figure 5C:
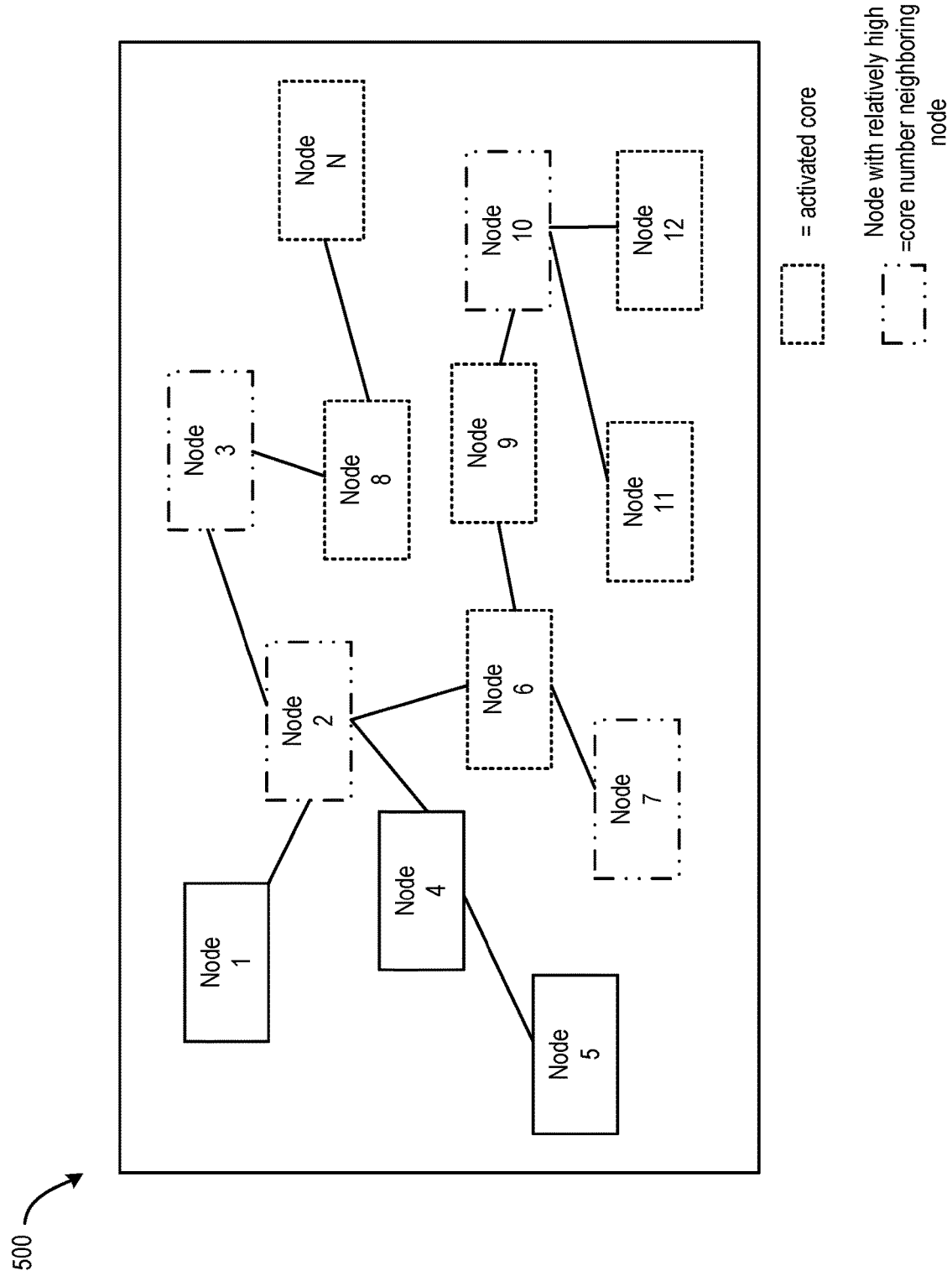

FIGS. 5A-5C depict an internet-based network 500, in accordance with one embodiment. As an option, the present internet-based network 500 may be implemented in conjunction with features from any other embodiment listed herein, such as those described with reference to the other FIGS. Of course, however, such internet-based network 500 and others presented herein may be used in various applications and/or in permutations which may or may not be specifically described in the illustrative embodiments listed herein. Further, the internet-based network 500 presented herein may be used in any desired environment.

Referring first to FIG. 5A, the internet-based network 500 includes a plurality of IoT devices, e.g., see Node 1, Node 2, Node 3, Node 4, Node 5, Node 6, Node 7, Node 8, Node 9, Node 10, Node 11, Node 12, and Node N. The nodes may be non-obligatory nodes.

Referring to FIG. 5B, an activated core, e.g., see Node 6, Node 8, Node 9, Node 11, Node N, and Node 12 is established. Each of the nodes is and/or only the nodes of the activated core are assigned a ranking. One node at a time of the activated core is selected and a traversal is made to determine rankings of neighboring nodes. For example, in FIG. 5C, nodes with neighboring nodes that have relatively high rankings are identified. ACCs for each of the nodes with neighboring nodes that have relatively high rankings may be established. Each ACC measures a resilience of individual nodes. This allows a check to be performed on random connections between the nodes as paths of the network, e.g., activated core trade paths. More specifically, each ACC defines a minimum number of neighboring nodes of the node associated with the ACC that, upon the minimum number of neighboring nodes being disconnected from the first network, cause the ranking of the associated node to decrease, e.g., see Equation (3) elsewhere above. An A-ACC is determined by aggregating the resilience of individual nodes, which is an indicative parameter for network resilience and an extent of such resilience. For example, a network may have a relatively high A-ACC, which means that the most influential nodes are unlikely to drop in ranking when these nodes lose connections to neighbor nodes. Such networks may be expected to have a relatively high core resilience. In contrast, networks having a relatively low A-ACC are expected to have low core resilience. In some approaches, an A-ACC may be established and used to determining whether to perform a communication operation using a path that includes the nodes in the first network, e.g., where the path includes the nodes represented in the A-ACC.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    defining a micro-operative of a first network, the first network having non-obligatory nodes, wherein the micro-operative includes rankings assigned to each of the nodes of the first network;
    establishing activated core covalences (ACCs) for the nodes, wherein each ACC defines a minimum number of neighboring nodes of the node associated with the ACC that, upon the minimum number of neighboring nodes being disconnected from the first network, cause the ranking of the associated node to decrease;
    establishing an aggregated activated core covalence (A-ACC), wherein the A-ACC corresponds to a sum of at least some of the ACCs of the nodes; and
    determining, based on the A-ACC, whether to perform a communication operation using a path that includes the nodes in the first network.

2. The computer-implemented method of claim 1, wherein the first network is an internet-based network, wherein the nodes are non-obligatory nodes of an activated core of the first network, wherein the activated core has a minimal utility driven topology that makes the first network functional.

3. The computer-implemented method of claim 1, wherein determining, based on the A-ACC, whether to perform the communication operation using the path that includes the nodes in the first network includes: comparing the A-ACC of the first network with an A-ACC of a second network, and performing the communication operation using the path that includes the nodes in the first network in response to a determination that the A-ACC of the first network is greater than the A-ACC of a second network.

4. The computer-implemented method of claim 1, wherein determining, based on the A-ACC, whether to perform the communication operation using the path of nodes in the first network includes: comparing the A-ACC of the first network with an A-ACC of a second network; in response to a determination that the A-ACC of the first network is greater than the A-ACC of a second network, identifying a first period of time for performing the communication operation using the path that includes the nodes in the first network; comparing the A-ACC of the second network with an A-ACC of a third network; and in response to a determination that the A-ACC of the second network is greater than the A-ACC of the third network, identifying a second period of time for performing the communication operation using a path that includes nodes in the second network.

5. The computer-implemented method of claim 4, wherein the communication operation is not performed using the path that includes the nodes in the second network during the first period of time, wherein the communication operation is not performed using the path that includes the nodes in the first network during the second period of time.

6. The computer-implemented method of claim 1, wherein the A-ACC does not incorporate the ACC of a first of the nodes in response to a determination that the minimum number of neighboring nodes defined by the ACC of the first node is less than a predetermined threshold.

7. The computer-implemented method of claim 1, wherein defining the micro-operative of the first network includes:
masking a first group of the nodes from the first network, and
determining an effect that the masking has on the rankings of a second group of the nodes.

8. A computer program product, the computer program product comprising a computer readable storage medium having program instructions embodied therewith, the program instructions readable and/or executable by a computer to cause the computer to:
define, by the computer, a micro-operative of a first network, the first network having non-obligatory nodes, wherein the micro-operative includes rankings assigned to each of the nodes of the first network;
establish, by the computer, activated core covalences (ACCs) for the nodes, wherein each ACC defines a minimum number of neighboring nodes of the node associated with the ACC that, upon the minimum number of neighboring nodes being disconnected from the first network, cause the ranking of the associated node to decrease;
establish, by the computer, an aggregated activated core covalence (A-ACC), wherein the A-ACC corresponds to a sum of at least some of the ACCs of the nodes; and
determine, by the computer, based on the A-ACC, whether to perform a communication operation using a path that includes the nodes in the first network.

9. The computer program product of claim 8, wherein the first network is an internet-based network, wherein the nodes are non-obligatory nodes of an activated core of the first network, wherein the activated core has a minimal utility driven topology that makes the first network functional.

10. The computer program product of claim 8, wherein determining, based on the A-ACC, whether to perform the communication operation using the path that includes the nodes in the first network includes: comparing the A-ACC of the first network with an A-ACC of a second network, and performing the communication operation using the path that includes the nodes in the first network in response to a determination that the A-ACC of the first network is greater than the A-ACC of a second network.

11. The computer program product of claim 8, wherein determining, based on the A-ACC, whether to perform the communication operation using the path of nodes in the first network includes: comparing the A-ACC of the first network with an A-ACC of a second network; in response to a determination that the A-ACC of the first network is greater than the A-ACC of a second network, identifying a first period of time for performing the communication operation using the path that includes the nodes in the first network; comparing the A-ACC of the second network with an A-ACC of a third network; and in response to a determination that the A-ACC of the second network is greater than the A-ACC of the third network, identifying a second period of time for performing the communication operation using a path that includes nodes in the second network.

12. The computer program product of claim 11, wherein the communication operation is not performed using the path that includes the nodes in the second network during the first period of time, wherein the communication operation is not performed using the path that includes the nodes in the first network during the second period of time.

13. The computer program product of claim 8, wherein the A-ACC does not incorporate the ACC of a first of the nodes in response to a determination that the minimum number of neighboring nodes defined by the ACC of the first node is less than a predetermined threshold.

14. The computer program product of claim 8, wherein defining the micro-operative of the first network includes:
masking a first group of the nodes from the first network, and
determining an effect that the masking has on the rankings of a second group of the nodes.

15. A system, comprising:
a processor; and
logic integrated with the processor, executable by the processor, or integrated with and executable by the processor, the logic being configured to:
define a micro-operative of a first network, the first network having non-obligatory nodes, wherein the micro-operative includes rankings assigned to each of the nodes of the first network;
establish activated core covalences (ACCs) for the nodes, wherein each ACC defines a minimum number of neighboring nodes of the node associated with the ACC that, upon the minimum number of neighboring nodes being disconnected from the first network, cause the ranking of the associated node to decrease;

establish an aggregated activated core covalence (A-ACC), wherein the A-ACC corresponds to a sum of at least some of the ACCs of the nodes; and determine based on the A-ACC, whether to perform a communication operation using a path that includes the nodes in the first network.

16. The system of claim 15, wherein the first network is an internet-based network, wherein the nodes are non-obligatory nodes of an activated core of the first network, wherein the activated core has a minimal utility driven topology that makes the first network functional.

17. The system of claim 15, wherein determining, based on the A-ACC, whether to perform the communication operation using the path that includes the nodes in the first network includes: comparing the A-ACC of the first network with an A-ACC of a second network, and performing the communication operation using the path that includes the nodes in the first network in response to a determination that the A-ACC of the first network is greater than the A-ACC of a second network.

18. The system of claim 15, wherein determining, based on the A-ACC, whether to perform the communication operation using the path of nodes in the first network includes: comparing the A-ACC of the first network with an A-ACC of a second network; in response to a determination that the A-ACC of the first network is greater than the A-ACC of a second network, identifying a first period of time for performing the communication operation using the path that includes the nodes in the first network; comparing the A-ACC of the second network with an A-ACC of a third network; and in response to a determination that the A-ACC of the second network is greater than the A-ACC of the third network, identifying a second period of time for performing the communication operation using a path that includes nodes in the second network.

19. The system of claim 18, wherein the communication operation is not performed using the path that includes the nodes in the second network during the first period of time, wherein the communication operation is not performed using the path that includes the nodes in the first network during the second period of time.

20. The system of claim 15, wherein the A-ACC does not incorporate the ACC of a first of the nodes in response to a determination that the minimum number of neighboring nodes defined by the ACC of the first node is less than a predetermined threshold.

* * * * *